United States Patent [19]

Kemp, Jr.

[11] Patent Number: 4,641,743
[45] Date of Patent: Feb. 10, 1987

[54] JUNCTION DEVICE FOR AUGER CONVEYORS

[76] Inventor: Dennis E. Kemp, Jr., P.O. Box 167, South Orange, N.J. 07079

[21] Appl. No.: 820,108

[22] Filed: Jan. 21, 1986

[51] Int. Cl.⁴ .................................................. B65G 33/32
[52] U.S. Cl. ......................................... 198/666; 198/670
[58] Field of Search ................ 198/666, 669, 670, 673

[56] References Cited

U.S. PATENT DOCUMENTS

| 3,072,243 | 1/1963 | Davis | 198/666 |
| 3,244,271 | 4/1966 | Wenning | 198/669 |
| 4,220,242 | 9/1980 | Forsberg | 198/666 |

FOREIGN PATENT DOCUMENTS 1341969 12/1962 France ................................. 198/666

Primary Examiner—Andres Kashnikow
Attorney, Agent, or Firm—Mark T. Basseches; Paula T. Basseches

[57] ABSTRACT

A junction for torque transmittingly connecting adjacent sections of an auger type conveyor eliminates the need for hanger bearings between conveyor sections. The junction includes a cylindrical sleeve having an external helix inclined to force conveyed material in an upstream direction in the area between the sleeve and trough and thus exert a lifting force on the junction. The sleeve includes a flow passage in registry with the helix and may include internal auger segments which mate with the conveyor sections.

13 Claims, 6 Drawing Figures

JUNCTION DEVICE FOR AUGER CONVEYORS

BACKGROUND OF THE INVENTION

1. Field of the Invention:

The present invention is in the field of auger feed devices and is directed more particularly to a junction for the torque-coupling connection of adjacent auger sections and the resultant auger conveyor.

2. The Prior Art

Auger conveyors are typically comprised of a trough within which an auger section or sections are mounted for rotation. Auger type conveyors may extend for great lengths.

Typically an elongate conveyor device is comprised of a number of auger sections linked in end-to-end torque transmitting relation. In accordance with conventional practice each adjacent pair of conveyor sections is supported in the area of coupling by a hanger bearing. By way of example, an advanced form of hanger bearing is disclosed in my U.S. Pat. No. 4,217,980 of Aug. 19, 1980 entitled Sealed Hanger Bearing for Auger Conveyor. The noted patent discloses a multiple section auger assembly whereby contamination resistant bearings suspended above the trough rotatably support the junction between the ends of auger sections.

The use of hanger bearings, even of the advanced type disclosed in the above referenced patent, is disadvantageous in that after a period time, the extent of which is dependent upon the nature of the material conveyed, the bearings will wear to the point that frictional build-up militates bearing replacement.

An additional drawback inherent in the use of hanger bearings resides in the fact that the spacing of auger sections necessitated by the interposition of a hanger bearing creates a significant frictional resistance to the flow of material in the conveyor. An efficiency loss of 15% or more is estimated to occur as a result of such interruption. Since, as noted above, it is not uncommon for a single conveyor to be comprised of a multiplicity of individual interconnected auger sections, it will be readily perceived that a 15% frictional loss at the interface between each such section drastically increases the required torque to effect material feed.

Attempts have been made to eliminate hanger bearings by applying anti-friction projections on portions of the auger flutes, which projections are in wiping contact with the floor of the trough. This procedure is successful in a relatively narrow range of applications, and should only be made when the material being handled is uniform and non-abrasive.

SUMMARY OF THE INVENTION

The present invention may be summarized as directed to the provision of a junction for auger sections which eliminates the need for providing hanger bearings, thereby eliminating the "down" time inherent in their frequent replacement.

The invention is further directed to a device of the type described which increases the auger feed efficiency by eliminating the frictional losses inherent in constructions in which the end of one auger section is spaced a distance from the beginning of the next adjacent section.

More particularly, the present invention may be summarized as directed to a junction for securing adjacent auger sections, the junctions comprising a cylindrical member having a central shaft supported by radially directed auger segments. The sleeve includes adjacent its upstream end a peripheral helix configuration arrayed in such manner that when the junction is rotated the helix tends to feed material entrapped between the trough and sleeve periphery in an upstream direction. The sleeve includes a radially extending aperture or apertures in registry with the helix.

The described device eliminate the necessity for providing a hanger bearing between adjacent auger sections while at the same time avoiding wear between the exterior of the sleeve and the trough. This surprising and unexpected result is accomplished by virtue of the helix functioning to draw material through the apertures in the sleeve and pump the same in an upstream direction, which action results in a lifting force reacting between the sleeve and trough and lifting the sleeve clear of the trough, whereby the sleeve "floats" during the feeding operation.

In accordance with a preferred embodiment, a second helix is mounted on the periphery of the sleeve at the downstream end thereof, which second helix is preferably arrayed to effect feed in a downstream direction.

The noted device, in addition to eliminating the use of hanger bearings with their attendant drawbacks, avoids the frictional losses described above since the internal auger segments of the junction blend with the ends of the connected auger sections to define, in effect, a continuous auger configuration.

It is accordingly an object of the invention to provide a junction for auger sections which eliminates the need for hanger bearings, and an auger conveyor assembly embodying the same.

A further object of the invention is the provision of a device of the type described which eliminates the frictional losses inherent in the use of hanger bearings.

To attain these objects and such further objects as may appear herein or be hereinafter pointed out, reference is made to the accompanying drawings forming a part hereof in which.

Figure 2:
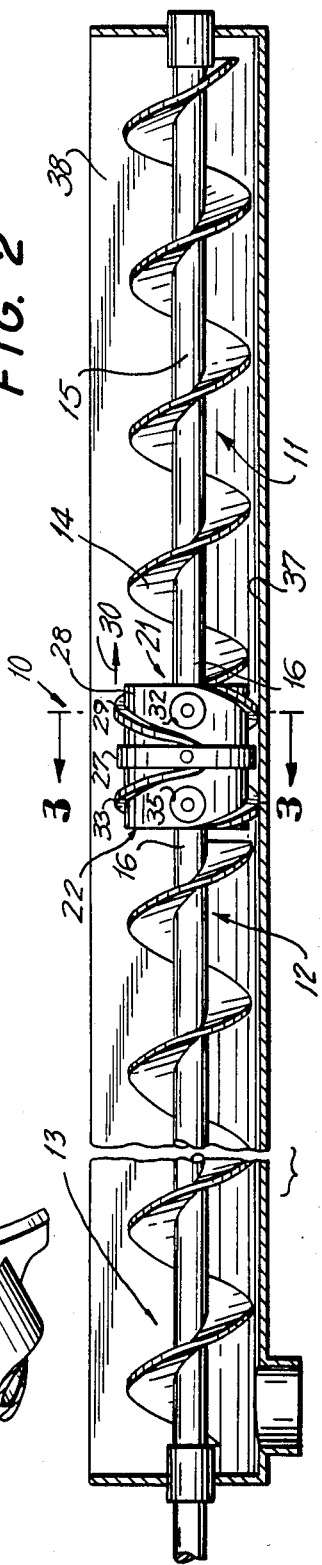
FIG. 2 is a vertical section through an auger feed conveyor.

Referring now to the drawings, there is shown in FIG. 2 in semi-diagrammatic fashion an auger feed assembly 10 which is comprised of two or more auger members or sections 11, 12, 13. As is conventional, the auger sections each comprise a helical auger or feed screw 14 mounted on a carrier in the form of a pipe 15. The pipe ends or junctions 16 include a pair of radially directed keying apertures 17, 17 and 18, 18 which function to receive the torque transmitting drive keys 19, 20, respectively.

Figure 3:
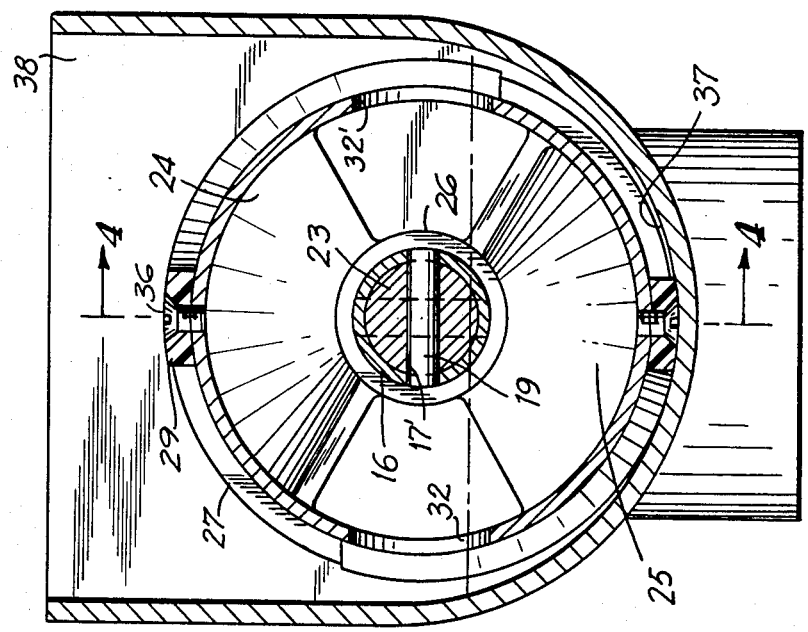
FIG. 3 is a magnified section taken on the line 3—3 of FIG. 2.

The junction assembly, illustrated generally at 21, is comprised of a cylindrical shell 22. A drive shaft 23 is concentrically mounted within the shell 22, the shaft being suspended by radially inwardly extending flute or auger segments 24, 25. As best seen in FIG. 3, the innermost ends of the segments are secured to a central hub 26 encompassing and keyed to the shaft 23. The shell 22 may include a central reinforcing annulus 27.

The shell adjacent its upstream end 28 includes on its outer periphery a helix member 29 preferably formed of an anti-friction material, such as nylon or like polymeric material.

Alternatively, and depending upon the nature of the material to be fed, the helix 29 may be formed of metallic components such as stainless steel or like wear resistant compositions.

Figure 1:
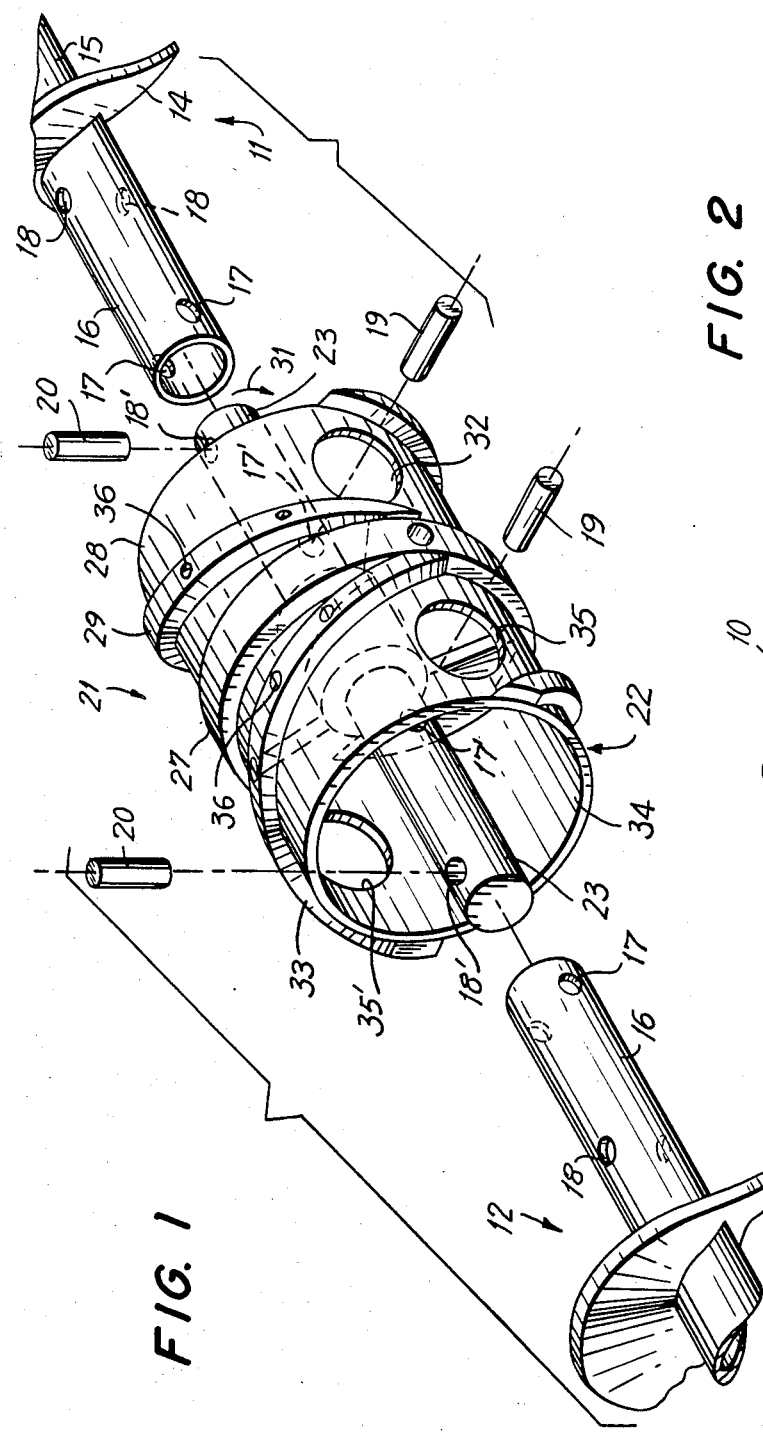
FIG. 1 is an exploded perspective view of an auger junction in accordance with the invention juxtaposed between a pair of auger sections to be linked.

The helix 29 is oriented such as to effect a feed of material in an upstream (see arrow 30, FIG. 2) when the auger assembly is driven in the rotary sense indicated by arrow 31, FIG. 1.

As will be apparent, the feed direction of the helix 29 is thus opposite the direction of feed imparted by the auger sections 11, 12, 13 when the same are rotated in the direction of the arrow 31.

The shell 22 includes one or more radially directed flow apertures 32, 32' in registry with the helix 29.

Preferably a second helix 33 is affixed to the periphery of the downstream end 34 of the shell 22, the shell being provided with flow apertures 35, 35' which register with the helix 33.

It will be appreciated that both helices 29 and 33 are preferably formed of the same wear resistant material and are secured as by recessed machine screws 36 to the outer periphery of the shell.

The junction member 21 is assembled between adjacent auger sections, e.g. 11, 12, by sleeving the hollow pipe end portions 16 of the pipes 15 over the oppositely directed ends of shaft 23. The drive apertures 17 and 18 of the auger sections are thereafter aligned with the cross drive apertures 17', 18' formed in the shaft 23 and the keying means 19,20 inserted so as non-rotatably couple the junction 21 and auger sections 11 and 12.

In the assembled condition as described, the downstream end of auger section 11 will define a continuation of one or the other of flute segments 24, 25, with the upstream end of auger section 12, forming a continuation of the other of the said segments 24, 25.

Figure 4:
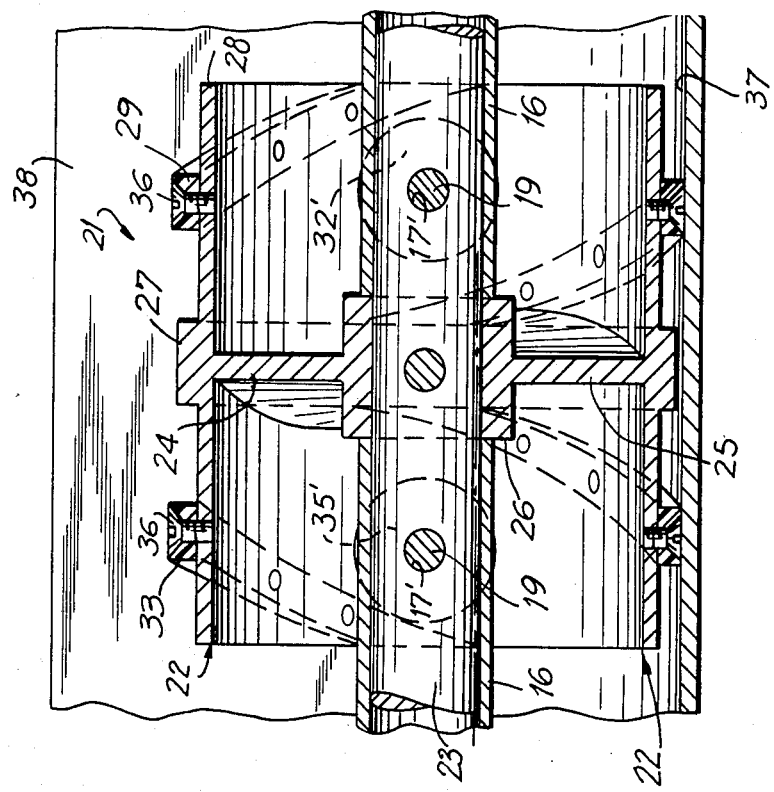
FIG. 4 is a fragmentary section taken on the line 4—4 of FIG. 3.

In the static or unfilled condition of the auger device (FIGS. 2, 3, and 4) the junction assembly 21 will rest on the floor 37 of the trough 38, the junction being supported by the polymeric peripheral helices 29, and 33, with the flutes of the auger remaining clear of the trough. When material is loaded into the trough and torque applied to the auger sections, the same will rotate in a direction of arrow 31, driving material in a downstream direction, i.e. from right to left as shown in FIG. 2.

Figure 6:
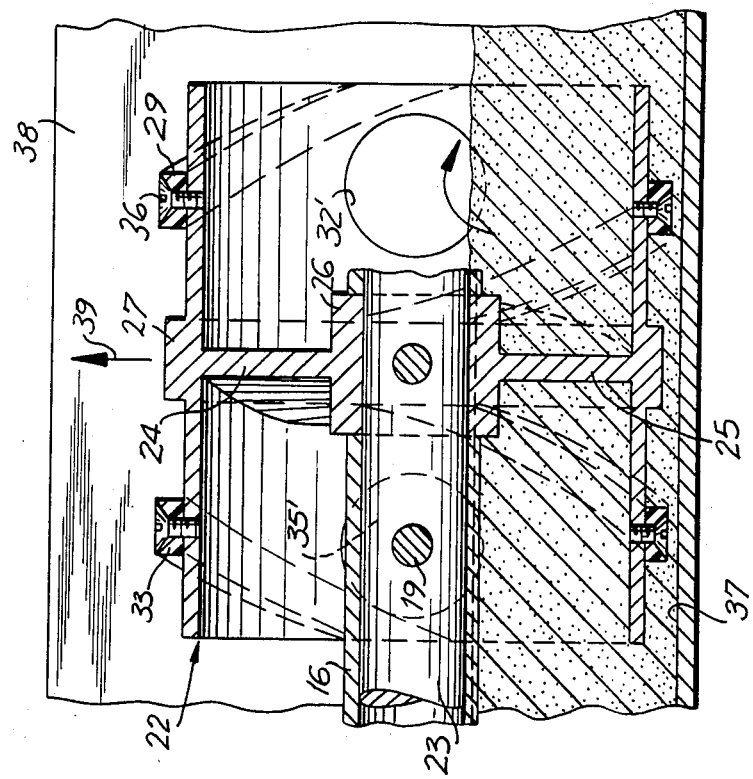
FIGS. 5 and 6 are views similar to FIGS. 3 and 4 respectively showing the position of the components during the feeding of material.
Figure 5:
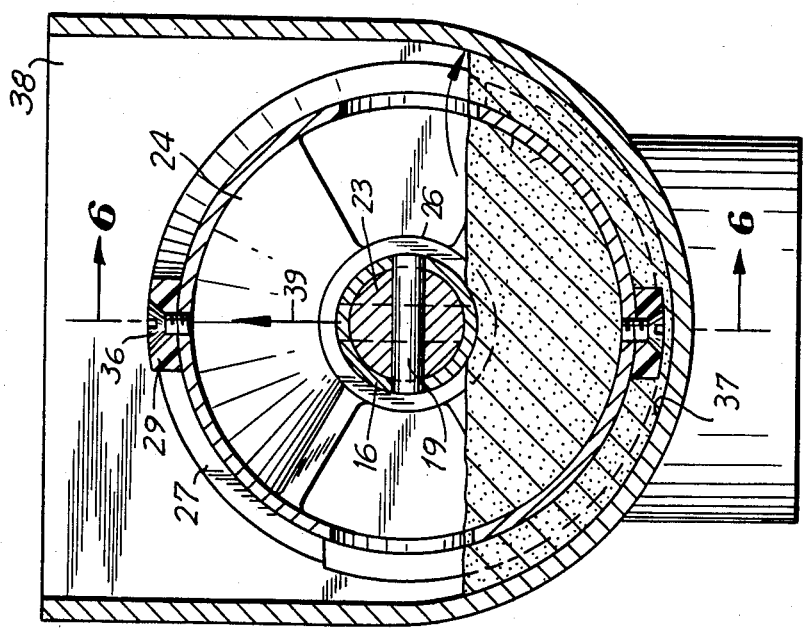

In the course of feeding movement the junction 21 will be bodily lifted from the floor 37 of the trough (i.e. in the direction of the arrows 39 and "float" in spaced relation to the floor, as shown for example in FIGS. 5 and 6 which represent the position of the parts in the driving and trough filled mode. The lifting action is engendered by the outflow of the fed material through the apertures 32, 32' and the rearward or upstream feed imparted to such material by the helix 29. In other words, the compressive forces generated by the upstream feed of helix 29 cause pressure in the area in registry with helix 29, which in turn induces the junction 21 to "float", whereby wear against the surface of the trough is minimized.

The helix 33 is arrayed to feed material passing outwardly through apertures 35, 35' in a downstream direction. While the device will function without the use of a second helix 33, the employment of both helices 29 and 33 is preferred since a single helix 29 tends to generate a canting force which would tend to tilt the shaft 23 laterally relative to the main feed direction. The employment of a second helix arranged in the noted downstream feed direction counteracts the noted canting force.

The device in accordance with the invention may be employed in conjunction with auger assemblies comprising a multiplicity of individual end-to-end linked auger sections. While the starting torque necessary to effect initial rotation may be somewhat higher than a conventional hanger bearing suspended auger assembly, the running torque is normally significantly lower than such conventional assemblies due to the reduced friction, as above noted.

Additionally and importantly, auger devices employing the junction may be used over protracted periods with no "down" time as encountered in conveyors of the auger type which employ hanger bearings.

As will be evident to those skilled in the art and familiarized with the instant disclosure, numerous changes may be made in details of construction without departing from the spirit of the invention. Accordingly, the invention is to be broadly construed within the scope of the appended claims.

Having thus described the invention and illustrated its use, what is claimed as new and is desired to be secured by Letters Patent is:

1. A hangerless anti-wear junction member for connecting adjacent auger conveyor sections within a trough, comprising a cylinder, shaft means mounted coaxially within said cylinder and extending in opposite directions for connecting the respective adjacent ends of said conveyor sections, internal auger segments interposed between the inner surface of said cylinder and said shaft means, said auger segments being oriented to advance material in said trough in a first direction responsive to rotation of said cylinder in a first sense, an external helix portion of wear resistant material formed on the periphery of said cylinder oriented to shift material in a direction opposite said first direction responsive to rotation of said cylinder in said first sense, and at least one radial flow passage formed through said cylinder in registry with said helix portion.

2. A junction member in accordance with claim 1 wherein said junction includes an upstream end and a downstream end, said helix being disposed adjacent said upstream end, the combination including a second helix of wear resistant material formed on said periphery adjacent said downstream end, and a radial flow passage formed through said cylinder in registry with said second helix.

3. A junction member in accordance with claim 2 wherein said second helix is oriented to shift material in said trough in said first direction.

4. A junction member in accordance with claim 1 and including coupler means on said shaft means for linking said conveyor sections to said shaft means in torque transmitting relation.

5. A junction member in accordance with claim 1 wherein said shaft means is supported in said cylinder by connection to said internal auger segments.

6. A conveyor device comprising a trough having a generally arcuate bottom portion, first and second auger conveyor sections mounted for rotation in said trough, an anti-wear junction member joining an end of one said section to an end of the other said section in torque transmitting relation, said junction including shaft means spanning said sections and coaxially disposed with respect thereto, a cylinder surrounding and coaxially located with respect to said shaft means, internal auger segments interposed between the inner surface of said cylinder and said shaft means, said auger segments being oriented to advance material in said trough in a first direction coincident with the feed direction of said sections responsive to rotation of said cylinder in a first sense, an external helix portion of wear resistant material formed on the periphery of said cylinder, said helix portion being oriented to shift material in said trough in a direction opposite said first direction responsive to rotation of said cylinder in said first sense, and at least one radial flow passage formed through said cylinder in registry with said helix portion.

7. A conveyor device in accordance with claim 6 wherein said auger segments are juxtaposed to and define continuations of the auger portions of said conveyor sections.

8. A conveyor device in accordance with claim 6 wherein said junction member includes an upstream end and a downstream end, said helix being disposed adjacent said upstream end, the combination including a second helix of wear resistant material formed on said periphery adjacent said downstream end, and a radial passage formed through said cylinder in registry with said second helix.

9. A junction member in accordance with claim 8 wherein said second helix is oriented to shift material in said trough in said first direction.

10. A junction member in accordance with claim 6 and including coupler means on said shaft means for linking said conveyor sections to said shaft means in torque transmitting relation.

11. A junction member in accordance with claim 6 wherein said shaft means is supported in said cylinder by connection to said internal auger segments.

12. A junction device for the hangerless support of a pair of adjacent auger conveyor sections mounted in a trough, comprising a cylindrical sleeve member, coupling means in said sleeve member for locking distal ends of said sections to said sleeve member in torque transmitting relation, a helix member mounted on the external periphery of said sleeve member, said helix member being formed of wear resistant material, said helix member having a feed direction opposite the feed direction of said sections, and a radially directed flow aperture formed through said sleeve member in registry with said helix member.

13. A junction device in accordance with claim 12 wherein said helix member is mounted adjacent a first end of said sleeve, said sleeve member including a second helix member of wear resistant material mounted on said periphery adjacent the opposite end of said sleeve, said second helix member having a feed direction opposite said helix member, said sleeve including a radially directed flow aperture formed through said sleeve member in registry with said second helix member.

* * * * *